BIDIRECTIONAL PULSE COUNTING CIRCUITS WITH NOR AND NAND LOGIC

Filed June 15, 1964 2 Sheets-Sheet 1

INVENTORS
MARVIN FELCHECK
JAMES J. WALKER
BY Stewart F. Moore
ATTORNEY

BIDIRECTIONAL PULSE COUNTING CIRCUITS WITH NOR AND NAND LOGIC

Filed June 15, 1964 2 Sheets-Sheet 2

INVENTOR

MARVIN FELCHECK

JAMES J. WALKER

BY [signature]

ATTORNEY

United States Patent Office 3,295,063
Patented Dec. 27, 1966

3,295,063
BIDIRECTIONAL PULSE COUNTING CIRCUITS WITH NOR AND NAND LOGIC

Marvin Felcheck, Bayside, and James J. Walker, Bronx, N.Y., assignors to American Machine & Foundry Company, a corporation of New Jersey Filed June 15, 1964, Ser. No. 374,982
5 Claims. (Cl. 328—44)

This invention relates to binary counting circuits and more particularly to high speed bidirectional counting circuits.

In the development of counting circuits, prior-art workers have sought to achieve higher operating speeds by decreasing the shifting time required by the circuit. However, with the shift initiated by the leading edge of the input pulse, markedly decreasing the shifting time has sometimes resulted in the input pulse persisting after the shift has been completed, with the result that a second shift occurs in response to the same input pulse. Such a double shift obviously results in an erroneous count.

A primary object of the present invention is to devise a high speed counting circuit wherein each input pulse results in only a single count.

Another object is to provide a counting circuit responsive to negative going input pulses without the need for inversion circuits.

A further object is to provide a counting circuit capable of counting in both a forward and a reverse direction in response to input pulses supplied on separate shift lines.

Yet another object is to provide a counter which, though including only a minimum of circuit components, can function as a shift register or as a multistable ring counter.

Counting circuits in accordance with the invention include a plurality of substantially identical stages each including three basic logic circuit "building blocks" best understood when discussed in binary logic terms. The invention employs NOR circuits and NAND circuits, defined as follows:

A NOR circuit is one yielding a "0" output if either of its inputs is at "1."

A NAND circuit is one yielding a "0" output if both of its inputs are at "1."

The invention embodies a trigger circuit which differentiates an input pulse to provide, for a positive going square wave input pulse, for example, a positive spike followed by a negative spike. Each stage includes a bistable or "flip-flop" circuits, two trigger circuits and two NOR circuits. The forward count input line is connected to one input of one NOR circuit in each stage, the reverse count input line being connected to one input of the other NOR circuit of each stage. The remaining input of each NOR circuit is enabled by the output of the flip-flop circuit of the stage in which the NOR circuit is included, so as to provide an output only when that stage has been placed in condition for a shift, only one of the several bistable circuits in the counter being so prepared at any given time.

The bistable circuits each include two NAND circuits cross-connected to form a bistable unit, this arrangement allowing the bistable to change state only when provided with a negative input pulse. The trigger circuit which provides the input to the bistable circuit produces a negative pulse coincident in time with the trailing edge of the input pulse being supplied by the forward shift line or the reverse shift line, the arrangement thus efficiently providing for shifting only at the end of an input pulse so that the aforementioned double shift, and the attendant erroneous count, are eliminated.

One particularly advantageous embodiment of the invention will be described with reference to the accompanying drawings, which form a part of this specification, and wherein:

FIGS. 2A–2K are diagrams of wave forms occurring at various points in the circuit of FIG. 1;

Figure 1:
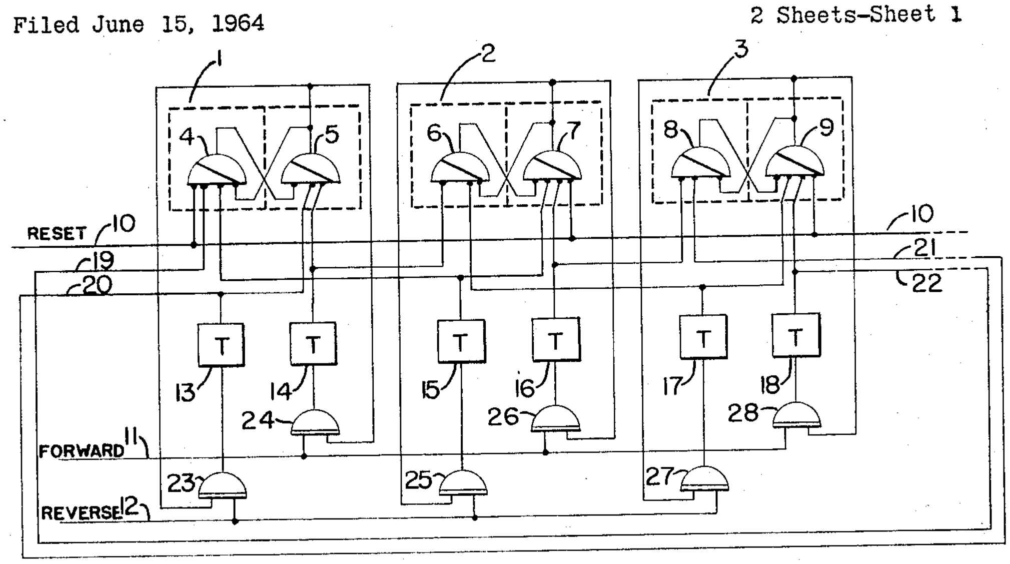
FIG. 1 is a circuit diagram of three stages of a high speed bidirectional counter in accordance with the invention.

Referring now to the drawings in detail, and first to FIG. 1 thereof, it will be seen that the portion of the counting circuit shown includes bistable circuits 1, 2 and 3, bistable circuit 1 including a NAND circuit 4 and a NAND circuit 5, each of the NAND circuits having an output terminal and a multiplicity of input terminals, the output terminal of each being connected to one of the input terminals of the other. Similarly, NAND circuits 6 and 7 are cross-connected to form bistable circuit 2, and NAND circuits 8 and 9 are cross-connected to form bistable circuit 3. One of the inputs of NAND circuit 4 is connected to a reset input line 10, another to the output terminal of a trigger circuit 15, and, another via conductor 19, to a trigger circuit in a preceding stage. It is to be understood that the three stages shown can function as a complete counter, but that they would not be used in this manner to their best advantage, and that the counter usually will include additional stages similar to those illustrated.

One of the input terminals of NAND circuit 5 is connected to the output terminal of a trigger circuit 13 and another to the output terminal of trigger circuit 14. It will be seen that in each stage the output terminal of the left-hand trigger circuit is connected to an input terminal of a NAND circuit in the right-hand half of its associated bistable circuit, and also to an input terminal of the NAND circuit in the left-hand half of the bistable circuit in the preceding stage. The output terminal of the trigger circuit in the right-hand half of each stage is connected to an input terminal of the NAND circuit in the right-hand half of the bistable circuit of its associated stage, and also to an input terminal of the NAND circuit in the left-hand half of the following stage. Thus, conductor 19 can be assumed to be connected to the output terminal of the right-hand trigger circuit in the preceding stage, and conductor 20, which is connected to the output terminal of trigger circuit 13, can be assumed to be connected to an input terminal of the NAND circuit in the left-hand half of the preceding stage, not shown.

Alternatively, conductor 20 could be connected to conductor 21 and thereby to an input terminal of NAND circuit 8 in the left-hand half of bistable circuit 3. Similarly, conductor 19 could be connected to conductor 22, and thereby to the output terminal of trigger circuit 18. If these latter two connections were made, the circuit would constitute a three-stage, or tristable, ring counter.

Following the pattern described above, the output terminal of trigger circuit 14 is connected to the input terminals of NAND circuits 5 and 6, the output terminal of trigger circuit 15 is connected to input terminals of NAND circuits 4 and 7, etc.

The input terminal of trigger circuit 13 is connected directly to the output terminal of NOR circuit 23. Similarly, the input terminals of trigger circuits 14–18 are connected to the output terminals of NOR circuits 24–28, respectively. One of the input terminals of each of the NOR circuits 24, 26, and 28 is connected to a forward count input line 11. One of the two input terminals of each of the NOR circuits 23, 25, and 27 is connected to a reverse count input line 12. The other input terminal of each of the NOR circuits 23 and 24 is connected to the output terminal of NAND circuit 5 in the right-hand half of bistable circuit 1. Similarly, the other input terminals of NOR circuits 25 and 26 are connected to the output terminal of NAND circuit 7 in bistable circuit 2, and the other input terminals of NOR circuit 27 and 28 are connected to the output terminal of NAND circuit 9 in bistable circuit 3. Each of the NOR circuits 23–28 is therefore connected to sense, at one input terminal each, the condition of one half of its associated bistable circuit.

Figure 4:
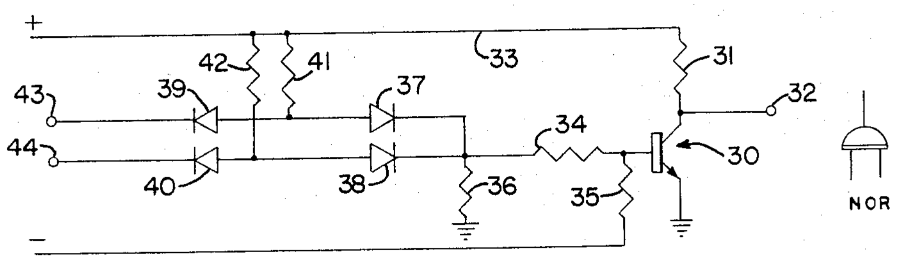
FIG. 4 is a schematic diagram of a NOR circuit employed in the counter of FIG. 1.

Referring now to FIG. 4, it will be seen that the NOR circuit shown includes a transistor indicated generally at 30, the emitter of which is connected to ground, and the collector of which is connected to one terminal of a resistance 31, and to an output terminal 32. The other terminal of resistance 31 is connected by conductor 33 to a source of positive D.C. voltage. The base of transistor 30 is connected to one terminal each of two resistances 34 and 35, the other terminal of resistance 35 being connected to a source of negative D.C. voltage, and the other terminal of resistance 34 being connected to the junction of one terminal of resistance 36 and the cathodes of semiconductor diodes 37 and 38. The other terminal of resistance 36 is connected to ground and the anodes of the parallel diodes 37 and 38 are connected, respectively, to the anodes of semiconductor diodes 39 and 40, the junction of the anodes of diodes 37 and 39 being also connected to one terminal of resistance 41, and the anodes of diodes 38 and 40 being also connected to one terminal of resistance 42. The other terminals of resistances 41 and 42 are connected to conductor 33 and thus to the positive D.C. supply. The cathodes of diodes 39 and 40 are connected to two input terminals 43 and 44, respectively.

In discussing the operation of this and the following circuits herein, the binary notation is employed for convenience and clarity of explanation. A count of binary "1" will indicate the existence of a positive voltage equal in magnitude to the voltage supplied by the positive D.C. source. A count of "0" will indicate the presence of zero voltage at the point under discussion. In the operation of the NOR circuit, if the inputs at terminals 43 and 44 are both "0," heavy current flow will occur from the positive D.C. voltage source through resistors 41 and 42 and diodes 39 and 40, the voltages at the anodes of diodes 39 and 40 therefore being very close to zero. Diodes 37 and 38 will therefore be nonconducting, and the voltage at the base of transistor 30 will be determined by the voltage divider circuit formed by resistances 36, 34, and 35, between ground and the negative D.C. supply terminal. The values of resistances 36, 34, and 35 are so selected that in this circumstance the voltage at the base of transistor 30 will be negative, placing transistor 30 in its nonconductive state. Very little current will therefore flow through the collector of transistor 30 and resistance 31, and the voltage at output terminal 32 will be approximately that of the positive D.C. voltage source, therefore providing a count of "1."

If either of the input terminals 43 or 44 is provided with an input of "1," i.e., a voltage approximately equal to the positive D.C. source voltage, the one of diodes 39 or 40 associated with that terminal will be essentially nonconductive, and the anode of that diode will be at approximately the source voltage. The one of diodes 37 or 38 connected to the nonconductive one of diodes 39 or 40 will therefore be placed in a conductive state. Assuming that a "1" input exists at terminal 43, diode 39 will be nonconductive, and current will flow from the positive D.C. source through resistor 41, diode 37, and resistances 34 and 35 to the negative D.C. terminal. The voltage at the base of transistor 30 is then established by the voltage divider circuit including resistances 41, 34, and 35, the values of these resistances being so chosen that the voltage at the transistor base will be positive, rendering the transistor conductive. Collector current will therefore flow through resistor 31, and output terminal 32 will be at approximately zero voltage, providing a count of "0." A count of "1" at terminal 44, or at both of terminals 43 and 44, simultaneously, will likewise yield a count at terminal 32 of "0." Thus, the NOR circuit provides a zero output if either or both of the inputs are "1," but will provide a "1" output only if both of the inputs are at "0."

Figures 5, 6:
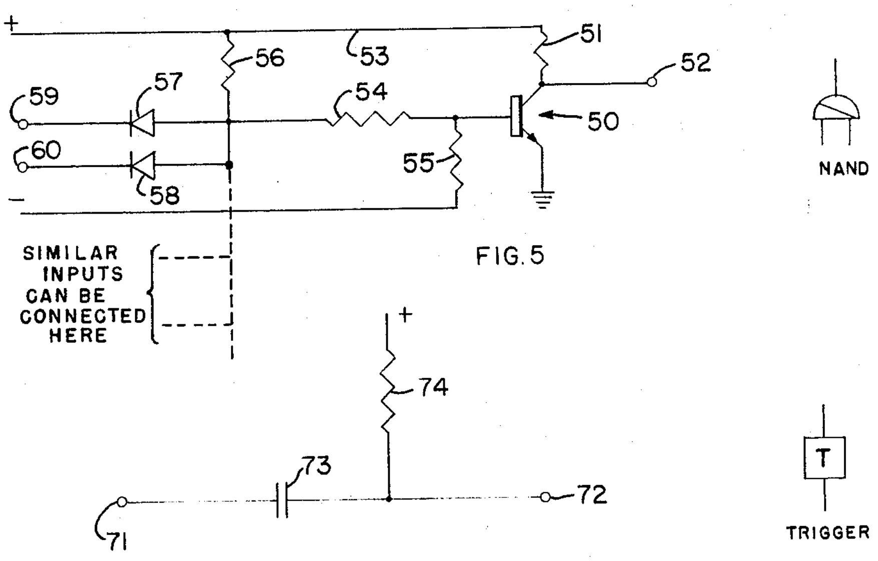
FIG. 5 is a schematic diagram of a NAND circuit, two of which are employed in the bistable circuit of FIG. 3.
FIG. 6 is a schematic diagram of a trigger circuit employed in the counter of FIG. 1.

Referring now to FIG. 5, it will be seen that the NAND circuit shown includes a transistor 50, the emitter of which is connected to ground and the collector of which is connected to one terminal of a resistance 51 and to an output terminal 52. The other terminal of resistance 51 is connected to conductor 53 and thence to the positive terminal of the D.C. voltage source. The base of transistor 50 is connected to one terminal of each of two resistances 54 and 55, the other terminal of resistor 55 being connected to the negative terminal of the D.C. voltage source, and the other terminal of resistor 54 being connected to one terminal of a resistance 56 and also to the anodes of two semiconductor diodes 57 and 58. The other terminal of resistor 56 is connected to conductor 53 and thence to the positive terminal of the D.C. voltage source. The cathode of diode 57 is connected to an input terminal 59, and the cathode of diode 58 is connected to an input terminal 60.

If both input terminals 59 and 60 are supplied with "1" inputs, i.e., with positive voltages equal in magnitude to that of the positive D.C. source voltage, the diodes 57 and 58 will be nonconductive, and the voltage at the base of transistor 50 will be determined by the voltage divider circuit including resistances 56, 54, and 55, between the positive and negative D.C. supply terminals. The values of these resistances are so selected that, under these circumstances, the base voltage of transistor 50 will be positive, allowing the transistor to conduct heavily, producing a voltage at output terminal 52 which is very close to zero, and which will provide a "0" count. If the input to terminal 59 is "0," current will flow from the positive source through resistance 56 and diode 57, allowing the voltage at the anode of diode 57 to drop to a level close to zero, thereby producing a voltage at the base of transistor 50 which is determined by the voltage divider circuit constituted by resistances 54 and 55, that voltage being less than zero and sufficiently negative to render the transistor nonconductive. The collector current will then essentially terminate, allowing the voltage at the output terminal 52 to increase to the source voltage level, providing a "1" count. If a "0" count exists at either terminal 59 or terminal 60, or at both simultaneously, the output count will be "1." It will be clear to one skilled in the art that many inputs can be added to the NAND circuit with the same basic operation.

Figure 3:
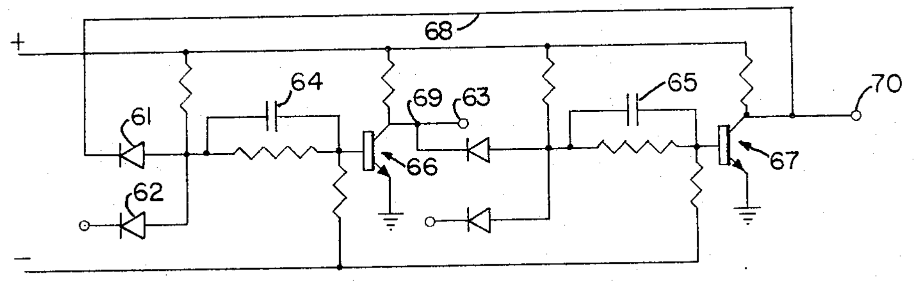
FIG. 3 is a schematic diagram of a bistable circuit employed in the counter of FIG. 1.

The circuit of FIG. 3 includes two of the NAND circuits of FIG. 5 so connected as to form a bistable unit, those circuit elements between diodes 61 and 62 and output terminal 63 constituting one NAND circuit, and the remaining elements constituting the other NAND circuit. Capacitors 64 and 65 are added in parallel with the base resistors of transistors 66 and 67, respectively, to allow the occurrence of a short interval input pulse to have a more immediate effect at the transistor base than would be possible with only a base resistor. A conductor 68 performs the cross-connecting function from the right-hand NAND circuit output to the left-hand NAND circuit input terminal, and junction 69 at the collector of transistor 66 performs the cross-connecting function from the left-hand NAND output to the right-hand NAND input terminal. As the circuit is employed in this embodiment, output terminal 63 is not used, and output terminal 70 becomes the output for the entire bistable circuit. It should also be noted that either or both of these output terminals can be used if it is desired to extract information from the system at any chosen stage.

The circuit of FIG. 6 will be recognized by one skilled in the art as being a conventional differentiation circuit, used herein as a trigger circuit. Application of a positive square wave pulse to input terminal 71 will cause charging of capacitor 73 through resistance 74, producing a sharp rise in voltage at terminal 72, followed by an exponential decay. At the trailing edge of the square wave pulse, the capacitor will discharge, producing a sharp fall in voltage at terminal 72, again followed by an exponential decay.

Figures 2A, 2B, 2C, 2D, 2E, 2F, 2G, 2H, 2J, 2K:
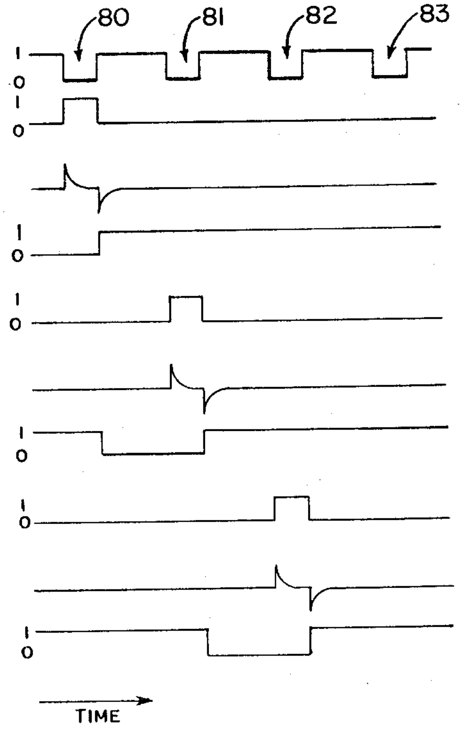

Referring now to FIGS. 2A–K, it will be seen that these waveform diagrams indicate the voltages existing at various points in the circuit of FIG. 1 at various times in the counting sequence. FIG. 2A illustrates a succession of pulses which may exist at either the forward count input line 11 or the reverse count input line 12. Assuming initially that a reset pulse is applied to reset line 10, bistable circuit 1 will be set to its "0" state in which the output of NAND circuit 5 is "0" and the output of NAND circuit 4 is "1." Bistable circuits 2 and 3 will be set to their "1" states, in which the left-hand NAND circuits are in the "0" state and the right-hand NAND circuits are in the "1" state in each of these stages. Similarly, any other stages existing in the circuit will be set in the same manner as bistable circuits 2 and 3, bistable circuit 1 being the only circuit in the system in which the reset line is connected to the left-hand NAND circuit. This arrangement assures that only one of the stages will be in a condition to respond to the first input pulse. Before pulse 80, which is the first input pulse in the succession shown in FIG. 2A, is applied to the system, the forward count input line 11 may be considered to be in its "1" state, pulse 80 reducing it to its "0" state for the length of the pulse. As pulse 80 is applied to input line 11, it is simultaneously applied to one input of each of the NOR circuits 24, 26, and 28. The other inputs of these NOR circuits are connected to the outputs of their respective bistable circuits as described above, the second input of NOR circuit 24 being supplied with a "0" input and the other inputs of NOR circuits 26 and 28 being supplied with a "1" input.

As described in conjunction with FIG. 4, it is necessary for both inputs of the NOR circuit to be simultaneously supplied with "0" signals before a "1" output will occur. NOR circuit 24 is therefore the only one of the NOR circuits which is capable of supplying an output. This output, illustrated at FIG. 2B, is supplied to the input of trigger circuit 14. Trigger circuit 14 differentiates the input pulse, as described above, producing an output which consists of a positive spike coincident with the leading edge of pulse 80, and a negative spike coincident with the trailing edge of pulse 80, illustrated at FIG. 2C. FIG. 2D indicates the voltage existing at the output of NAND circuit 5, which is the output of binary circuit 1. FIG. 2G shows the voltage existing at the output of NAND circuit 7, which is the output of binary circuit 2. Note that the positive spike of FIG. 2C, the output of trigger circuit 14, has no effect on either NAND circuit 5 or 6, those circuits being responsive only to the negative spike. Both NAND circuits 5 and 6, and therefore bistable circuits 1 and 2, change state at the occurrence of the negative spike coincident with the trailing edge of pulse 80, as illustrated in FIGS. 2D and 2G.

Bistable circuit 1 is now in its "1" state and bistable circuit 2 is now in its "0" state, NOR circuit 26 now being supplied with a "0" input from its associated bistable circuit and now being the only one of the NOR circuits in a condition to respond to the next one of the successive input pulses. On occurrence of the next input pulse, indicated at 81 in FIG. 2A, NOR circuit 26 produces a positive pulse, shown at FIG. 2E, which activates trigger circuit 16 to produce the positive and negative spikes shown at FIG. 2F. These spikes are applied to NAND circuits 7 and 8, causing NAND circuit 7 and bistable circuit 2 to change state, as shown in FIG. 2G, and NAND circuit 8 and bistable circuit 3 to change state, as shown at FIG. 2K. NOR circuit 28 is now placed in a condition to respond to the next input pulse, indicated at 82, in FIG. 2A, the results of which are shown at FIGS. 2H, 2J, and 2K.

The next successive pulse, indicated at 83 in FIG. 2A, would be effective to change the state of the next stage in the series in a manner similar to that described above, the existence of such other stages being indicated by the dashed portions of conductors 10, 21, and 22 in FIG. 1. Each pulse thereafter would operate to move the count one stage to the right. If conductors 21 and 22 were connected directly to conductors 20 and 19, respectively, with no intervening stages, as suggested above, the system would be a three-stage ring counter, and pulse 83 would have the same effect as pulse 80, pulse 82 having acted to reset bistable circuit 1 in preparation for the next successive pulse.

The process of counting in the reverse direction involves the same basic steps as described above, except that the input pulses applied to the reverse count input line are now connected to NOR circuits 23, 25, and 27 in FIG. 1 rather than to 24, 26 and 28; and that one of trigger circuits 13, 15 or 17 is now operative to supply a positive and a negative spike to the NAND circuit in the right-hand half of the bistable circuit of its associated stage, and to the NAND circuit in the left-hand half of the bistable circuit in the preceding stage, thus preparing the preceding stage to respond to the next successive pulse.

Referring again to FIGS. 2A–K, and now viewing input pulses 80–83, indicated at FIG. 2A, as being applied to the reverse count input line, it will be seen that the pulse indicated at FIG. 2B represents the output of oneof NOR circuits 27, 25 or 23. Assuming that input pulse 80 occurs when the stage including bistable circuit 3 is in condition to respond, the pulse at FIG. 2B would represent the output of NOR circuit 27. FIG. 2C would then show the output of trigger circuit 17; FIG. 2D, the output of bistable circuit 3; and FIG. 2G the output of bistable circuit 2, which circuit would then be in condition to respond to pulse 81 indicated at FIG. 2A. From that point, the process would proceed in a manner similar to that described above.

Though one particularly advantageous embodiment of the invention has been chosen for illustrative purposes, it will be understood that various changes and modifications can be made therein without departing from the scope of the invention as defined in the appended claims.

What is claimed is:

1. In a bidirectional pulse counting circuit, the combination of a forward count input line to which successive input pulses can be supplied;

a reverse count input line to which successive input pulses can be supplied; and a plurality of interconnected stages each comprising bistable circuit means including a first circuit portion and a second circuit portion, each of said circuit portions having an input and an output, first trigger circuit means having an input, said first trigger circuit means being connected to provide an output both to said second portion of said bistable circuit means of the one of said stages including said first trigger circuit means and to said first portion of said bistable circuit means of the one of said stages preceding said one stage, second trigger circuit means having an input and being operative to provide an output both to said second portion of said bistable circuit means of said one stage and to said first portion of said bistable circuit means of the one of said stages succeeding said one stage, said first trigger circuit means effecting a count in a first direction coincident in time with termination of an input pulse supplied to said reverse count input line, said second trigger circuit means being operative to effect a count in a second direction coincident in time with termination of an input pulse supplied to said forward count input line, first logic circuit means having a first input, a second input, and an output, said output of said first logic circuit means being connected to said input of said first trigger circuit means of said one stage, said first input of said first logic circuit means being connected to said output of said second portion of said bistable circuit means of said one stage, said second input of said first logic circuit means being connected to said reverse count input line, said first logic circuit means being operative to provide an output signal only when "0" binary signals exist at said first and second inputs simultaneously, and second logic circuit means having a first input, a second input and an output, said output of said second logic circuit means being connected to said input of said second trigger circuit means of said one stage, said first input of said second logic circuit means being connected to said output of said second portion of said bistable circuit means of said one stage, said second input of said second logic circuit means being connected to said forward count input line, said second logic circuit means being operative to provide an output signal only when "0" binary signals exist at said first and second inputs of said second logic circuit means simultaneously

2. A bidirectional pulse counting circuit in accordance with claim 1 and wherein said first and second circuit portions of each of said bistable circuit means each include an additional input, said first and second circuit portions of each of said bistable circuit means each being operative to provide a "0" binary output signal only when both of its inputs are provided with "1" binary signals.

3. A bidirectional pulse counting circuit in accordance with claim 1 and wherein said trigger circuit means each include a differentiating circuit operative to differentiate input pulses supplied by said logic circuit means.

4. In a bidirectional pulse counting circuit, the combination of a forward count input line to which input pulses can be supplied;

a reverse count input line to which input pulses can be supplied;

a reset line to which reset pulses can be supplied; and a plurality of identical interconnected stages each comprising first logic circuit means having an output and two inputs, said first logic circuit means being operative operative to provide an output pulse only when both of said inputs are supplied simultaneously with a "0" binary input signal, one of said inputs being connected to receive pulses supplied to said forward count input line, second logic circuit means having an output and two inputs, said second logic circuit means being operative to provide an output pulse only when both of said inputs of said second logic circuit means are supplied simultaneously with a "0" binary input signal one of said inputs of said second logic circuit means being connected to receive pulses supplied to said reverse count input line, a plurality of trigger circuits each having an input connected to the output of one of said logic circuit means, each of said trigger circuits also having an output, and bistable circuit means inculding a first circuit portion and a second circuit portion, each of said circuit portions having an output, a first input, and a second input and being operatively associated with the first and second logic circuit means of the stage in which said bistable circuit means is included, the output of each of said circuit portions being connected to said first input of the other of said circuit portions, said circuit portions each being operative to provide an output when said first input thereof is provided with a "0" binary signal from the other of said circuit portions and said second input thereof is provided with a negative input pulse, said other input connection of said first and second logic circuit means being connected to the output of said second portion of said operatively associated bistable circuit means.

5. A bidirectional pulse counting circuit in accordance with claim 4 and wherein said trigger circuits each being operative to provide, in response to a positive input pulse, an output signal comprising a negative peak coincident in time with the trailing edge of said positive input pulse, the negative peak of said output signal from each of said trigger circuits effecting a change of state of the bistable circuit means operatively associated therewith.

References Cited by the Examiner

UNITED STATES PATENTS

| | | | |
|---|---|---|---|
| 2,964,653 | 12/1960 | Cagle et al. | 307—88.5 |
| 3,139,540 | 6/1964 | Osborne | 307—88.5 |

Pub. I, I.B.M. Technical Disclosure Bulletin, vol. 3, No. 9, Feb. 1961, page 21 "'NAND' Logic Clock" by Zentgraf.

Pub. II, "Trends in Logic Circuit Design" by Lambert, in Electronics, Dec. 6, 1963, pp. 38–45.

ARTHUR GAUSS, *Primary Examiner.*

S. D. MILLER, *Assistant Examiner.*